Oct. 30, 1962     S. I. SUDEIKIS     3,061,333
BUMPER HITCH FOR TOWING ATTACHMENTS
Filed June 19, 1961     2 Sheets-Sheet 1
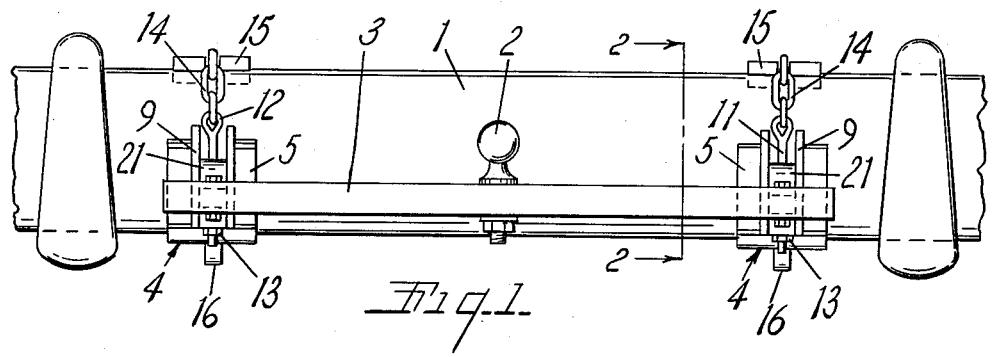
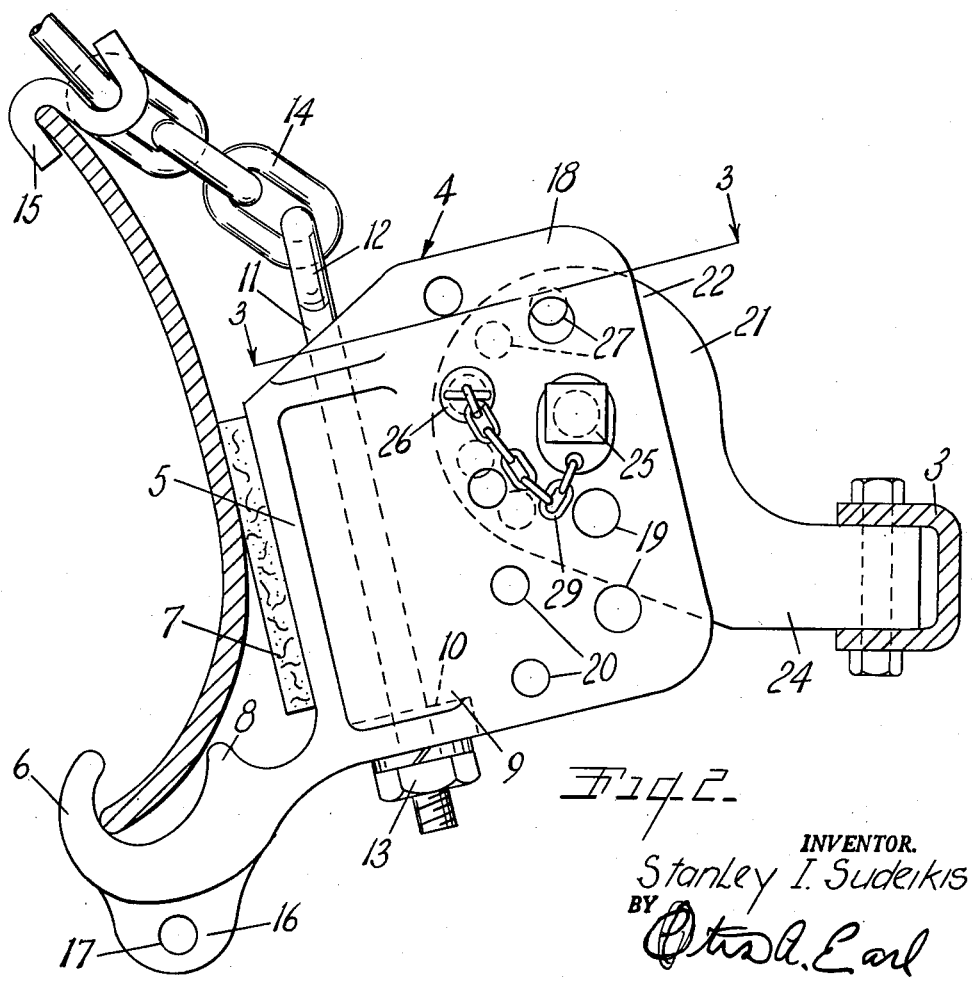
INVENTOR.
Stanley I. Sudeikis
BY
ATTORNEY Oct. 30, 1962     S. I. SUDEIKIS     3,061,333
BUMPER HITCH FOR TOWING ATTACHMENTS
Filed June 19, 1961     2 Sheets-Sheet 2
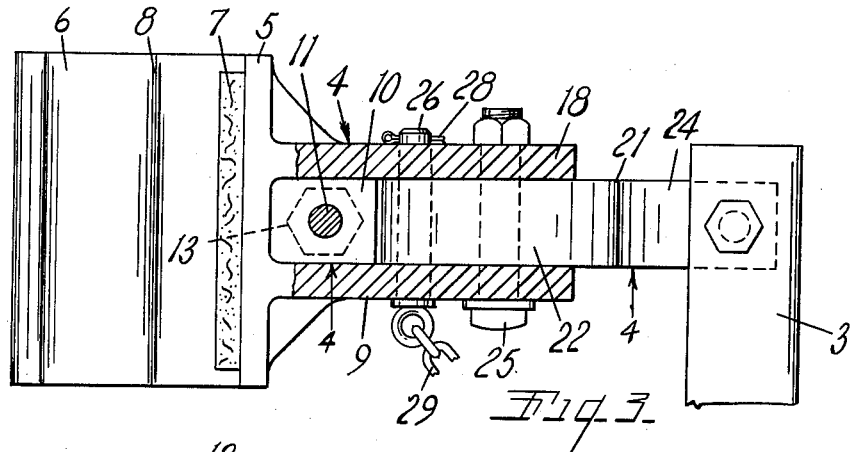
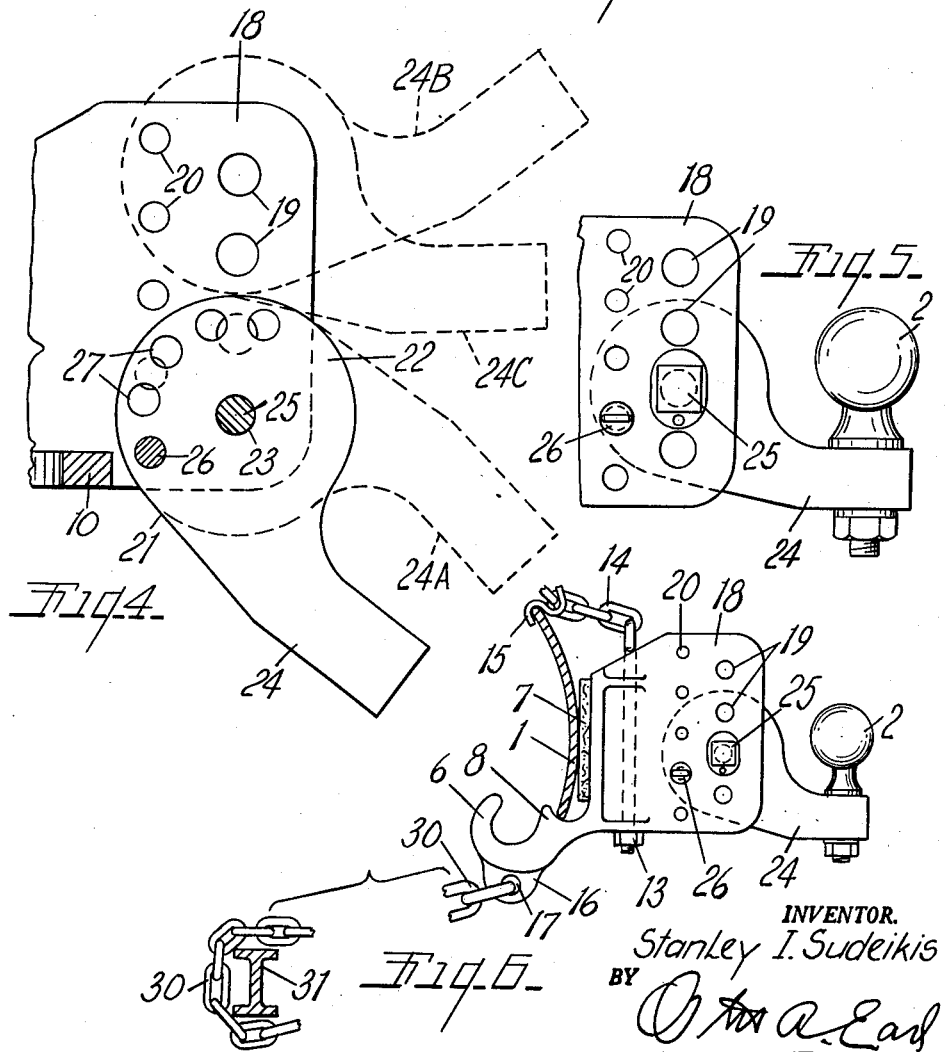
INVENTOR.
Stanley I. Sudeikis
BY
ATTORNEY.

United States Patent Office 3,061,333
Patented Oct. 30, 1962

3,061,333
BUMPER HITCH FOR TOWING ATTACHMENTS
Stanley I. Sudeikis, Kalamazoo, Mich., assignor to Pilot Distributing Company, Battle Creek, Mich.
Filed June 19, 1961, Ser. No. 118,182
7 Claims. (Cl. 280—490)

This invention relates to improvements in bumper hitch for towing attachments. The principal objects of the invention are:

First, to provide a hitch connection attachable to automobile bumpers of different contours which will support a towing attachment at different elevations and angles relative to the bumper.

Second, to provide a hitch connection which is easily attachable to various bumpers in multiples of one by a single chain for each multiple.

Third, to provide a hitch connection which can be attached to a bumper to locate the hitch and further connected by a chain to an axle or frame member of the vehicle to transmit the main portion of the towing load to the axle or frame and relieve the bumper from strain and protect it from damage.

Fourth, to provide a novel structure for adjustably mounting a coupling member on a hitch connection so that a wide variety of vertical and angular positions of the coupling member and a towing attachment carried thereby are possible simply by adjusting the position of two pins.

Fifth, to provide an angularly adjustable draft connection in which the draft load is distributed between two clevis pins, one of which is adjustable relative to the other and to the draft members to effect angular adjustment thereof.

Other objects and advantages of the invention will be apparent from a consideration of the following description and claims. The drawings, of which there are two sheets, illustrate a highly practical form of the bumper hitch and towing attachment and two modified applications thereof.

FIG. 1 is a fragmentary rear elevational view of the rear bumper of an automobile with a preferred form of the hitch connection and towing attachment of the invention in place thereon.

FIG. 2 is a fragmentary vertical cross sectional view taken along the plane of the line 2—2 in FIG. 1.

FIG. 3 is a fragmentary horizontal cross sectional view through the hitch taken along the plane of the line 3—3 in FIG. 2.

FIG. 4 is a fragmentary vertical cross sectional view taken along the plane of the line 4—4 in FIG. 3 and illustrating in phantom various adjusted positions of the hitch and towing connections.

FIG. 5 is a fragmentary side elevational view of a first modified form of the hitch connection.

FIG. 6 is a fragmentary side elevational view of a further modified application or use of the hitch shown in FIG. 5.

FIG. 1 illustrates the rear bumper 1 of an automobile. The towing attachment connected thereto in the example illustrated consists of a ball element 2 mounted on a carrying or crossbar 3 of forwardly opening channel shaped cross section. The crossbar is connected to the bumper by two identical hitch assemblies designated generally by the numeral 4. Each hitch assembly consists of an integral metal forging or casting having a main body plate 5 with a forwardly projecting, upwardly opening hook 6 formed on its bottom edge. The hook extends across the full width of the body plate to engage a substantial length of the lower edge of the bumper 1 as it appears in FIG. 2. The body plate is provided with a non-metallic pad 7 to engage the rear face of the bumper. Regardless of the transverse curvature of the lower edge of the bumper, the pad 7 can be engaged with the surface of the bumper. An intermediate rib 8 on the upper side of the hook serves to form an auxiliary hook to engage the lower edge of generally flat bumpers (see FIG. 6).

The body plate has two laterally spaced rearwardly projecting side plates 9 formed thereon with a bottom plate 10 connecting the bottoms of the side plates. The bottom plate 10 is apertured to pass the shank of an eyebolt 11 having an eye 12 on its upper end and a nut and lock washer 13 on its lower end. The eye 12 is connected to one end of a chain 14 and the chain is provided with a removable S-hook 15 that engages selected links of the chain in a position to hook over the upper edge of the bumper 1. Tightening the nut 13 securely fastens the body plate 5 to the bumper. The vertical rib 16 on the bottom of the hook 6 and having a hole 17 therein is provided for an auxiliary connection to be described.

Integrally connected along the rear edges of the side plates 9 and projecting rearwardly and upwardly therefrom are two vertical clevis plates 18. The clevis plates are bored in first series of vertically spaced holes 19 that are aligned transversely in the two plates. Forwardly of the first series of holes 19, the plates 18 are bored with a second series of holes 20 which in the example illustrated are somewhat smaller than the holes 19. The second holes 20 are spaced equally to the holes 19 but are staggered to be between the holes 19 so that each hole 19 has two holes 20 disposed in angularly spaced relation about the hole 19. Each intermediate hole 20 thus occupies a dual position as the lower hole relative to the superadjacent hole 19 and as the upper hole relative to subadjacent hole 19.

Positioned between the clevis plates 18 is a coupling member 21 having an arcuate segmental end 22 with a hole 23 therein and having a rearwardly projecting tongue 24. The tongue 24 is off center with respect to the hole 23 so that a radial plane through the hole 23 passes closer to one side of the tongue than the other. This relationship becomes significant in the adjustment of the hitch as will be described presently.

The coupling member 21 is tiltably supported on the clevis plates 18 by a bolt 25 that is passed selectively through one of the pairs of holes 19 to adjust the level of the coupling member. Because of the off center relationship of the sides of the tongue 24 to the center of the hole 23, inverting the tongue as shown by dotted lines at 24A in FIG. 4 and moving it between holes 19, a wide variety of elevations of the tongue can be achieved. With the four holes 19 illustrated and two positions of the tongue at each hole, eight positions are available.

The angular position of the coupling member 21 is determined by passing a second bolt or pin 26 selectively through either the upper hole 20 or lower hole 20 associated with the particular hole 19 from which the coupling member is supported and through one of the several holes 27 formed through the segmental end 22 of the coupling member in angularly spaced relation about the hole 23. The angular spacing between the holes 20 relative to each hole 19 is a non-integral multiple of the spacing between the holes 27 so that each hole 27 registers with each of two holes 20 in different angular positions of the coupling member. With the five holes 27 illustrated, this gives ten angular positions for each of the eight vertical positions of the coupling member, or eighty adjustments of the ball hitch member 2. Two angular positions of the coupling member are illustrated in dotted lines at 24B and 24C in FIG. 4. Note that both bolts or pins 25 and 26 will transmit towing loads from the coupling member to the clevis plates.

The pin 26 is held in place by a cotter 28 and is conveniently attached to a light chain 29 to prevent loss.

When relatively light loads are to be pulled, the ball hitch 2 may be mounted directly on the tongue 24 of a single hitch assembly 4 as is shown in FIG. 5. When a bumper is encountered which is relatively weak such as the flat bumper 1b in FIG. 6, a chain 30 may be passed through the hole in the lower flange 16 and extended forwardly to an axle or frame member 31 of the vehicle. The chain 30 then carries part of the towing load and prevents damage to the bumper.

I have illustrated and described my invention in a highly practical embodiment thereof. I have not attempted to illustrate or describe other adaptations or embodiments which I contemplate, as I believe this disclosure will enable those skilled in the art to embody or adapt my invention as may be desired.

What is claimed as new is:

1. A bumper hitch for a ball towing element comprising a crossbar having the ball towing element mounted on the top of its mid-section, a pair of hitch assemblies connected to the ends of said bar, each hitch assembly comprising an upright body plate adapted to rest in facing relation to the surface of a bumper and having a forwardly extending hook on its lower edge adapted to engage the lower edge of the bumper, a pad on said body plate, spaced upright side plates projecting forwardly from said body plate and connected at the bottom by a bottom plate, an eye bolt anchored at the bottom on said bottom plate and projecting upwardly between said side plates, a chain connected to the top of said eye bolt and having a hook engageable over the top edge of a bumper, spaced clevis plates extending rearwardly from said side plates and thereabove, a first series of vertically spaced and transversely aligned holes formed in said clevis plates, a second series of holes formed in said plates and staggered between said first holes, a coupling member positioned between said clevis plates and having a segmental arcuate end with a hole therein, a draft bolt passed through said hole in said coupling member and selectively through a pair of holes in said first series, a third series of holes formed in said coupling member and spaced arcuately about the hole therein, a pin passed selectively through one of the third set of holes and a pair of holes in said second series, and a rearwardly projecting tongue on said coupling member having an upright hole formed therethrough, said tongue being parallel to and vertically off center with respect to a radial plane passed through the hole in the coupling member, said tongues on said pair of hitch assemblies being bolted to the ends of said crossbar by bolts passed through the holes in the tongues.

2. A bumper hitch for a ball towing element comprising a crossbar having the ball towing element mounted on the top of its mid-section, a pair of hitch assemblies connected to the ends of said bar, each hitch assembly comprising an upright body plate adapted to rest in facing relation to the surface of a bumper and having a forwardly extending hook on its lower edge adapted to engage the lower edge of the bumper, spaced upright side plates projecting forwardly from said body plate and connected by a bottom plate, a bolt anchored at the bottom on said bottom plate and projecting upwardly between said side plates, a chain connected to said bolt and having a hook engageable over the top edge of a bumper, spaced clevis plates extending rearwardly from said side plates, a first series of vertically spaced and transversely aligned holes formed in said clevis plates, a second series of holes formed in said plates and staggered between said first holes, a coupling member positioned between said clevis plates and having a hole therein, a draft bolt passed through said hole in said coupling member and selectively through a pair of holes in said first series, a third series of holes formed in said coupling member and spaced arcuately about the hole therein, a pin passed selectively through one of the third set of holes and a pair of holes in said second series, and a rearwardly projecting tongue on said coupling member having an upright hole formed therethrough, said tongue being vertically off center with respect to a radial plane passed through the hole in the coupling member, said tongues on said pair of hitch assemblies being bolted to the ends of said crossbar by bolts passed through the holes in the tongues.

3. A bumper hitch comprising a crossbar having the towing element mounted on its mid-section, a pair of hitch assemblies connected to the ends of said bar, each hitch assembly comprising an upright body plate adapted to rest in facing relation to the surface of a bumper and having a forwardly extending hook on one horizontal edge adapted to engage the one edge of the bumper, spaced upright side plates projecting rearwardly from said body plate and connected by a cross plate, a bolt anchored on said cross plate and projecting between said side plates, a chain connected to said bolt and having a hook engageable over the opposite edge of a bumper from said hook on said body plate, spaced clevis plates extending rearwardly from said plates, a first series of vertically spaced and transversely aligned holes formed in said clevis plates, a second series of holes formed in said plates and staggered between said first holes, a coupling member positioned between said clevis plates and having a hole therein, a draft bolt passed through said hole in said coupling member and selectively through a pair of holes in said first series, a third series of holes formed in said coupling member and spaced arcuately about the hole therein, a pin passed selectively through one of the third set of holes and a pair of holes in said second series, and a rearwardly projecting tongue on said coupling member having an upright hole formed therethrough, said tongue being vertically off center with respect to a radial plane passed through the hole in the coupling member, said tongues on said pair of hitch assemblies being secured to the ends of said crossbars by bolts passed through the holes in the tongues.

4. A bumper hitch comprising a crossbar having the towing element mounted on its mid-section, a pair of hitch assemblies connected to the ends of said bar, each hitch assembly comprising an upright body plate adapted to rest in facing relation to the surface of a bumper and having a forwardly extending hook on one horizontal edge adapted to engage the one edge of the bumper, spaced upright side plates projecting rearwardly from said body plate and connected by a cross plate, a bolt anchored on said cross plate and projecting between said side plates, a chain connected to said bolt and having a hook engageable over the opposite edge of a bumper from said hook on said body plate, spaced clevis plates extending rearwardly from said plates, a first series of vertically spaced and transversely aligned holes formed in said clevis plates, a second series of holes formed in said plates and staggered between said first holes, a coupling member positioned between said clevis plates and having a hole therein, a draft bolt passed through said hole in said coupling member and selectively through a pair of holes in said first series, a third series of holes formed in said coupling member and spaced arcuately about the hole therein, a pin passed selectively through one of the third set of holes and a pair of holes in said second series, and a rearwardly projecting tongue on said coupling member having an upright hole formed therethrough, said tongues on said pair of hitch assemblies being secured to the ends of said crossbar.

5. A bumper hitch for a ball towing element comprising an upright body plate adapted to rest in facing relation to the surface of a bumper and having a forwardly extending hook on its lower edge adapted to engage the lower edge of the bumper, spaced upright side plates projecting rearwardly from said body plate and connected by a bottom plate, a bolt anchored at the bottom on said bottom plate and projecting upwardly between said side plates, a chain connected to said bolt and having a hook engageable over the top edge of a bumper, spaced clevis plates extending rearwardly from said side plates, a first series of vertically spaced and transversely aligned holes formed in said clevis plates, a second series of holes formed in said plates and staggered between said first holes, a coupling member positioned between said clevis plates and having a hole therein, a draft bolt passed through said hole in said coupling member and selectively through a pair of holes in said first series, a third series of holes formed in said coupling member and spaced arcuately about the hole therein, a pin passed selectively through one of the third set of holes and a pair of holes in said second series, and a rearwardly projecting tongue on said coupling member having an upright hole formed therethrough, said tongue being vertically off center with respect to a radial plane passed through the hole in the coupling member, said tongue having said ball towing element mounted thereon.

6. A bumper hitch for a ball towing element comprising an upright body plate adapted to rest in facing relation to the surface of a bumper and having a forwardly extending hook on one horizontal edge adapted to engage one edge of the bumper, spaced upright side plates projecting rearwardly from said body plate and connected by a cross plate, a bolt anchored on said cross plate and projecting between said side plates, a chain connected to said bolt and having a hook engageable over the other edge of a bumper, spaced clevis plates extending rearwardly from said side plates, a first series of vertically spaced and transversely aligned holes formed in said clevis plates, a second series of holes formed in said plates and staggered between said first holes, a coupling member positioned between said clevis plates and having a hole therein, a draft bolt passed through said hole in said coupling member and selectively through a pair of holes in said first series, a third series of holes formed in said coupling member and spaced arcuately about the hole therein, a pin passed selectively through one of the third set of holes and a pair of holes in said second series, and a rearwardly projecting tongue on said coupling member having an upright hole formed therethrough, said tongue being vertically off center with respect to a radial plane passed through the hole in the coupling member, said tongue having said ball towing element mounted thereon.

7. A bumper hitch for a ball towing element comprising an upright body plate adapted to rest in facing relation to the surface of a bumper and having a forwardly extending hook on one horizontal edge adapted to engage one edge of the bumper, spaced upright side plates projecting rearwardly from said body plate, a cross plate between said side plates, a bolt anchored on said cross plate and projecting between said side plates, a chain connected to said bolt and having a hook engageable over the other edge of a bumper, spaced clevis plates extending rearwardly from said side plates, a first series of vertically spaced and transversely aligned holes formed in said clevis plates, a second series of holes formed in said plates and staggered between said first holes, a coupling member positioned between said clevis plates and having a hole therein, a draft bolt passed through said hole in said coupling member and selectively through a pair of holes in said first series, a third series of holes formed in said coupling member and spaced arcuately about the hole therein, a pin passed selectively through one of the third set of holes and a pair of holes in said second series, and a rearwardly projecting tongue on said coupling member having an upright hole formed therethrough, said tongue being vertically off center with resect to a radial plane passed through the hole in the coupling member, said tongue having said ball towing element mounted thereon.

References Cited in the file of this patent

UNITED STATES PATENTS

| | | |
|---|---|---|
| 1,914,963 | Stephens | June 20, 1933 |
| 2,575,171 | Hulse | Nov. 13, 1951 |
| 2,693,369 | Cross | Nov. 2, 1954 |
| 2,772,099 | Smith | Nov. 27, 1956 |
| 2,847,232 | Graham | Aug. 12, 1958 |